United States Patent [19]

Calka et al.

[11] Patent Number: 5,368,812
[45] Date of Patent: Nov. 29, 1994

[54] METAL CARBIDES AND DERIVED COMPOSITES MADE BY MILLING TO OBTAIN A PARTICULAR NANOSTRUCTURAL COMPOSITE POWDER

[75] Inventors: Andrzej Calka, Ainslie; Barry W. Ninham, Cook, both of Australia

[73] Assignee: Australian National University, Acton, Australia

[21] Appl. No.: 952,510
[22] PCT Filed: Jun. 12, 1991
[86] PCT No.: PCT/AU91/00248
§ 371 Date: Dec. 10, 1992
§ 102(e) Date: Dec. 10, 1992
[87] PCT Pub. No.: WO91/19584
PCT Pub. Date: Dec. 26, 1991

[30] Foreign Application Priority Data

Jun. 12, 1990 [AU] Australia .................. PK0576/90
Feb. 19, 1991 [AU] Australia .................. PK4679/91

[51] Int. Cl.$^5$ .................... B22F 3/16; B22F 1/00; C01B 31/30; C04B 35/64
[52] U.S. Cl. ................................... 419/5; 419/17; 419/32; 419/38; 419/45; 264/60; 264/DIG. 36
[58] Field of Search .......... 264/60, DIG. 36; 419/5, 419/6, 17, 32, 38, 45

[56] References Cited

U.S. PATENT DOCUMENTS

| | | | |
|---|---|---|---|
| 3,591,362 | 3/1968 | Benjamin | 75/211 |
| 3,865,586 | 2/1975 | Volin et al. | 75/203 |
| 3,914,371 | 10/1975 | Benton et al. | 264/332 |
| 4,124,665 | 11/1978 | Petersen et al. | 264/28 |
| 4,624,705 | 11/1986 | Jatkar et al. | 75/239 |
| 4,891,059 | 1/1990 | Diamond et al. | 75/0.5 R |

FOREIGN PATENT DOCUMENTS

| | | |
|---|---|---|
| 1630056 | 8/1958 | Australia . |
| 4463358 | 7/1959 | Australia . |
| 6251073 | 5/1975 | Australia . |
| 9001016 | 2/1990 | WIPO . |

*Primary Examiner*—Donald P. Walsh
*Assistant Examiner*—Anthony R. Chi
*Attorney, Agent, or Firm*—Harness, Dickey & Pierce

[57] ABSTRACT

Metal carbides may be formed by mixing metal powder with a stoichiometric amount of graphite, compressing the same in a mould/die and then sintering. High temperatures (and maybe a bonding agent) are required to effect the final step and finished product. These disadvantages are overcome by exploiting dry high energy milling to bring the starting materials into a very finely divided and reactive state, with regions of metal, carbon and metal based solid solution ranging from 3 to 100 nanometers in diameter. As an alternative source of carbon, cationic organic surfactants may be used instead of graphite in the appropriate proportion. Compacting the milled mixture, followed by sintering at lower temperatures by a margin of at least 400° C., will produce very strong dense carbides at low cost. The method may be extended to include metal based composites, which also includes cermets, by incorporating an appropriate excess of metal powder(s) in the starting materials. The carbides and their metal based composites have applications in the field of abrasives, cutting tips for lathe tools, masonry drills and master alloys for steels.

14 Claims, No Drawings

METAL CARBIDES AND DERIVED COMPOSITES MADE BY MILLING TO OBTAIN A PARTICULAR NANOSTRUCTURAL COMPOSITE POWDER

TECHNICAL FIELD

This invention concerns the production of carbide bodies. It also concerns the production of metallic composites in the form of a metal matrix with particles of a carbide dispersed within the matrix. More particularly, it concerns the synthesis of carbides, and the production of carbide bodies and composites consisting of a metal matrix with a dispersed phase of the metal carbide, using mechanical alloying techniques.

BACKGROUND

Metallic carbides are very hard materials. They are used as abrasives, as the cutting part of lathe tools, masonry drills and the like, and as additives which increase the strength and hardness of metals and alloys used as cutting tools.

The conventional preparation of carbide bodies involves the steps of
  (a) mixing a powder (preferably formed chemically, in the colloidal form) of a metal or a mixture of metals, the carbide of which is to be formed, with graphite powder in stoichiometric quantities to produce the required carbide or carbides, and optionally including an additive in the powder mixture to act as a bonding agent (for example, a quantity of powdered colbalt may be added to facilitate the bonding of the powder particles, particularly if a mixture of metal carbides is to be produced);
  (b) compressing the powder mixture in a mould or die to form a "green" product; and
  (c) sintering the "green" product at a temperature which enables the bonding between the powder particles to be effected, to form the carbide body.

It has been suggested previously that carbides can be produced by mechanical alloying. For example, the production of carbides of transition metals and elements of groups IIIA and IVA of the periodic table, using a mechanical alloying technique, has been described in the specification of International patent application No PCT/FR89/00384 (World Intellectual Property Organisation publication No WO 90/01016). The examples given in that specification show that when a small quantity of a powder of an element of the specified group is milled with graphite powder for around 24 hours in an inert atmosphere (usually argon), a carbide of the element is produced. In general, the carbide produced is that which would be expected from a complete reaction of a stoichiometric mixture of the element and graphite, but in some instances (for example, when the element is niobium, molybdenum or vanadium), "new" carbides are formed. However, the carbides formed by this technique (which is also reported in the paper by P Matteazze, G Le Caer and E Bauer-Grosse entitled "Synthesis of Advanced Ceramics by High Energy Milling") are deduced to be present from the analysis of X-ray diffraction patterns of the product powders and there appears to have been no attempt to form dense ceramic bodies from the small volume samples of the product carbides that are shown to be present. Certainly there is no indication that it would be possible to form machine tools or the like from carbide powders produced by the mechanical alloying process.

DISCLOSURE OF THE PRESENT INVENTION

It is an object of the present invention to provide a new, relatively inexpensive, and reliable method of producing (a) metal carbides, and (b) composites of metal or metal alloys having dispersed therein a quantity of a metal carbide, using mechanical alloying techniques.

This objective is achieved by mechanical alloying of particulate metals in a ball mill or the like with graphite and preferably, but not necessarily, with the addition of a surfactant. The milling of the powder is continued until a nanostructural mixture is achieved. At this stage, the mixture comprises small regions (sometimes layers) of metal and carbon, each region (or layer) having a thickness of several nanometers. Between these regions or thin layers, there are some particles of the true carbide, having a diameter of about 1 nanometer. This nanostructural mixture of metal, carbon and true carbides (which are present in a small proportion by weight and volume) can then be compacted in dies or moulds to form a required shape, which is subsequently annealed at a higher temperature. During the annealing step, there is a solid state reaction (transformation or formation) which produces either carbides as a single phase structure (for example, as an intermetallic phase), or equilibrium alloys of the metal/intermetallic type which contain carbides. Thus the annealing step produces a sintered body of the required carbide or of a metal/carbide composite.

The objective of the present invention is also achieved by the milling of a metal powder and an organic surfactant to form a nanostructural mixture of the metal and the organic compound, in which there are metal crystals distributed within a matrix of single metal atoms and atoms of carbon and hydrogen. This nanostructural mixture is very reactive. It can be moulded, then sintered at a temperature which is lower (usually by at least 400° C.) than the normal sintering temperature to produce a metal carbide body. During the sintering, the carbon atoms react with the metal crystals and metal atoms to produce the carbide, while most of the hydrogen atoms are released as a gas, thus creating a highly reducing atmosphere between the powder particles.

Thus, according to the present invention, there is provided a method of forming a metal carbide body, the method comprising the steps of
  (a) mixing a powder of the metal with graphite powder in substantially stoichiometric quantities for the metal carbide;
  (b) milling the powder mixture in a ball mill or the like until a nanostructural mixture is produced, said nanostructural mixture consisting of regions of carbon and regions of the metal or a metal based solid solution, with single atoms of the metal carbide at the interface between the regions of carbon and metal or metal based solid solution, said regions having an extent of from about 3 nanometers to about 100 nanometers;
  (c) moulding the nanostructural mixture to produce a moulded body; and
  (d) heating the moulded body to a temperature sufficient to cause (i) a solid state reaction between the carbon and the metal, and (ii) sintering of the moulded mixture, thereby producing a solid body of the metal carbide.

If metal powder substantially in excess of that required for the production of a single phase carbide body is included in the mixture of step (a) in the last preceding paragraph, it will be apparent to persons of skill in this art that a composite body, having a metal phase and a carbide phase, will be produced by this method.

Also according to the present invention, there is provided a method of forming a composite body comprising a metal matrix with a dispersed phase consisting of particles of a metal carbide, said method comprising the steps of (a) mixing a powder of the metal with graphite powder in substantially stoichiometric quantities for the metal carbide;

(b) milling the mixed powder in a ball mill or the like until a nanostructural mixture is produced, said nanostructural mixture consisting of regions of carbon and regions of the metal or a metal based solid solution, with single atoms of the metal carbide at the interface between the regions of carbon and metal or metal based solid solution, said regions having an extent of from about 3 nanometers to about 100 nanometers;

(c) mixing said nanostructural mixture with a powder of the metal in proportions corresponding to a pre-determined ratio of dispersed phase and matrix phase in the composite body;

(d) moulding said mixture of the nanostructural mixture and metal powder to form a moulded body; and (e) heating the moulded body to a temperature sufficient to cause (i) a solid state reaction to form the metal carbide, and (ii) sintering of the moulded body, thereby producing said composite.

As noted earlier in this specification, in each of the above-defined methods, a surfactant may be added to the mixture in the ball mill, to facilitate the milling to produce the nanostructural mixture.

An alternative method of producing a composite body comprising a metal matrix phase and a dispersed carbide phase is to form a carbide by the first method recited in the last three preceding paragraphs, then produce a powder of the metal carbide (for example, by crushing or hammer milling). The powdered carbide thus produced is then mixed in appropriate proportions with a powder of a metal, and this mixture is pressed in a mould to form a moulded body. Sintering of the moulded body then yields the required composite.

It will be clear to persons of skill in this art that in forming composites containing dispersed carbide particles, the metal matrix phase need not be the same metal as the metal of the carbide, and the metal matrix phase may be a metal alloy, not a single metal.

Further in accordance with the present invention, there is provided a method of forming a body of a carbide of a metal comprising the steps of:

(a) mixing a powder of the metal with an organic surfactant in proportions such that the carbon content of the surfactant provides substantially the stoichiometric quantity of carbon to form the metal carbide;

(b) ball milling the mixture of powder and surfactant to produce a nanostructural mixture comprising crystals of the metal, or of a metal based solid solution, dispersed within a matrix consisting of metal atoms, carbon atoms and hydrogen atoms, the metal or solid solution crystals having a diameter of the order of 10 nanometers; P1 (c) moulding the nanostructural mixture to form a moulded body; and (d) heating the moulded body to a temperature sufficient to cause (i) a solid state reaction between the metal and the carbon in the moulded body, (ii) release of the hydrogen as a gas, and (iii) sintering of the moulded body, to thereby produce a body of the metal carbide.

One suitable surfactant for this method is the surfactant dihexadecyl dimethyl ammonium acetate, but other surfactants may be used.

As in previous recitations of the present invention, if excess metal powder is included in the initial mixture of metal powder and surfactant, the product body will be a two-phase body consisting of a metal phase and a carbide phase, instead of being a single phase carbide body.

In each instance above where reference is made to moulding a powder or a powder mixture, a known binder may be used with the powder or powder mixture when pressing the powder or mixture in a mould or die.

A further discussion of the present invention, with embodiments of its implementation, will be now be provided.

In a series of experiments to demonstrate the production of metal carbides by the present invention, a ball mill with external magnets, of the type described in the specification of International patent application No PCT/AU90/00471, was used. A particular advantage of this type of ball mill is that it can be operated in a number of "modes", each providing a different energy transfer per impact of the steel balls within the chamber of the mill. Examples taken from the experiments are provided below.

EXAMPLE 1

To produce metal carbide bodies, commercially available graphite powder and metal powder were mixed in stoichiometric quantities for the required carbide. The mixture was milled with the ball mill operated in the low temperature mechanical alloying mode, which is defined in the specification of International patent application No PCT/AU90/00471. The powder mixture was ground for about 10 hours, at which stage a nanostructural mixture had been formed. In some experiments, this nanostructural mixture consisted of alternating layers of metal and carbon, each layer having a thickness ranging from several nanometers to up to about 50 nanometers, with a number of particles of pure metal carbide at each interface between the layers. In other experiments, the nanostructural mixture consisted of regions of metal particles and regions of carbon, each region having a "diameter" of from a few nanometers to about 50 nanometers, with some particles of pure metal carbide at the interfaces between these regions. In both types of nanostructural mixture, the particles of pure metal carbide had a diameter of about 1 nanometer. It should be noted that, apart from the production of the relatively minor phase of pure metal carbide particles, no chemical reaction had occurred during the milling of the particles.

The nanostructural mixture was then pressed into a mould to form a compacted or moulded body of a required shape. The compacted or moulded body was subsequently heated to a high temperature, to cause the solid state reaction to form the metal carbide and to sinter the moulded body and produce a solid carbide body.

Carbides of the following metals were successfully produced using this technique:

aluminium ($Al_4C_3$),
boron ($B_4C$),
chromium ($Cr_3C_2$ and $Cr_7C_3$),
iron ($Fe_3C$),
manganese ($MnC_3$),
silicon (various forms of $Si_xC_y$),
tantalum (TaC),
titanium (TiC),
tungsten (various forms of $W_xC_y$), and
vanadium (various forms of $V_xC_y$).

It should be noted that ceasing the mechanical alloying when the nanostructural mixture has been produced is an important feature of the present invention. The nanostructural mixture is readily compacted to a required shape and the high temperature heating of the compacted mixture causes the carbon and metal present to react to form the carbide. This reaction is believed to be initiated by the small metal carbide particles acting as nucleation sites which grow to form a hard, dense carbide material. Thus the heating step both anneals (forms the carbide body) and sinters the product body in a single step.

It is also believed that during the combined carbide formation and sintering, a significant proportion of the chemical reaction between the metal and the carbon is achieved by atomic bonding (and not simply by inter-particle bonding). Thus the carbide produced by this process will have stronger bonds—and hence a greater hardness—than carbides produced by other processes.

In some experiments, an organic surfactant was added to the mixture of metal powder and graphite powder in the ball mill. The addition of an organic surfactant was found to reduce the time required to produce the nanostructural mixture.

EXAMPLE 2

Dense bodies of iron carbides and carbon-containing steel have been produced in experiments in which the carbon in the carbide was obtained from an organic surfactant. In each of these experiments, a mixture of iron powder and an organic surfactant was milled until a nanostructural mixture was produced. The nanostructural mixture had the appearance of small iron particles coated with surfactant. However, closer examination showed that this mixture was, fact, a mixture of metal (iron) crystals distributed in a matrix of single metal atoms and atoms of carbon and hydrogen, with the metal crystals having a diameter of about 10 nanometers. The proportions of surfactant and powder in the original mixture were chosen so that the carbon atoms in the surfactant comprised the stoichiometric quantity of carbon to produce, with the iron powder, the required carbide, $Fe_xC_y$.

The nanostructural mixture thus produced is especially reactive. Even when lightly pressed in a mould to form a porous moulded body, which was subsequently heated to anneal and sinter the body, it yielded a mechanically strong body. This fact indicates that strong inter-atomic bonds are established in the reaction between the metal and carbon in the nanostructural mixture. In the majority of the experiments with this mixture, however, the nanostructural mixture was pressed into a mould to form a compacted, dense body of a required shape which was subsequently heated to a temperature which was sufficient (a) to cause the carbon and metal to react to form an iron carbide, (b) to release the hydrogen as a gas, and (c) to sinter the product body. In this way, very strong, dense iron carbides were produced.

A noteable feature of this implementation of the present invention is that the release of hydrogen, during the combined annealing and sintering process, creates a strongly reducing atmosphere around the particles of the moulded body. Thus the product body is formed without oxidation occurring either within or on the surface of the iron carbide body.

Not all organic surfactants are suitable for the production of iron carbides. However, of those which are suitable for this purpose, all cationic surfactants work well; and dihexadecyl dimethyl ammonium acetate (which contains 38 carbon atoms, 75 hydrogen atoms, one nitrogen atom and two oxygen atoms) has been used very successfully.

In general, the degree of hydration of the surfactant can be controlled through a choice of the head group of the surfactant, or counterions. Other organic polymers and other carbon-containing compounds may be used, provided they have suitable surface-active properties.

Another feature of this implementation of the present invention is that the addition of atoms of, for example, cobalt and vanadium (which could be useful in the production of high tensile steels) can be effected by using a surfactant with an ionic species which includes such atoms.

Industrial Application

Carbides produced using the present invention are particularly useful in machine tools and in rock and masonry drills, where they may be used as the cutting edge or, in metal composites, as hardening elements. They may also be used as abrasives.

Although specific examples of the present invention have been described above, metallurgists and materials scientists will appreciate that variations in the methods outlined in this specification may be made without departing from the present inventive concept.

We claim:

1. A method of forming a metal carbide body, said method comprising the steps of
   (a) mixing a powder of the metal with graphite powder in substantially stoichiometric quantities for the metal carbide;
   (b) milling the mixed powder in a ball mill or the like until a nanostructural mixture is produced, said nanostructural mixture consisting of regions of carbon and regions of the metal or a metal based solid solution, with single atoms of the metal carbide at the interface between the regions of carbon and metal or metal based solid solution, said regions having an extent of from about 3 nanometers to about 60 nanometers;
   (c) moulding the nanostructural mixture to produce a moulded body; and
   (d) heating the moulded body to a temperature sufficient to cause (i) a solid state reaction between the carbon and the metal, and (ii) sintering of the moulded mixture, thereby producing a solid body of the metal carbide.

2. A method of producing a composite consisting of a metal matrix with a dispersed phase therein, said dispersed phase consisting of particles of a metal carbide, said method comprising the steps of (a) mixing a powder of the metal with graphite powder in substantially stoichiometric quantities for the metal carbide;

(b) milling the mixed powder in a ball mill or the like until a nanostructural mixture is produced, said nanostructural mixture consisting of regions of carbon and regions of the metal or a metal based solid solution, with single atoms of the metal carbide at the interface between the regions of carbon and metal or metal based solid solution, said regions having an extent of from about 3 nanometers to about 100 nanometers;

(c) mixing said nanostructural mixture with a powder of the metal in proportions corresponding to a pre-determined ratio of dispersed phase and matrix phase in the composite body;

(d) moulding said mixture of the nanostructural mixture and metal powder to form a moulded body; and (e) heating the moulded body to a temperature sufficient to cause (i) a solid state reaction to form the metal carbide, and (ii) sintering of the moulded body, thereby producing said composite.

3. A method as defined in claim 1 including the step of adding a surfactant to the powder mixture in the ball mill or the like to facilitate the production of the nanostructural mixture.

4. A method as defined in claim 3, in which the surfactant is a cationic surfactant.

5. A method as defined in claim 3, in which the surfactant is dihexadecyl dimethyl ammonium acetate.

6. A method of forming a body of a carbide of a metal, said method comprising the steps of:

(a) mixing a powder of the metal with an organic surfactant in proportions such that the carbon content of the surfactant provides substantially the stoichiometric quantity of carbon to form the metal carbide;

(b) ball milling the mixture of powder and surfactant to produce a nanostructural mixture comprising crystals of the metal, or of a metal based solid solution, dispersed within a matrix consisting of metal atoms, carbon atoms and hydrogen atoms, the metal or solid solution crystals having a diameter of about 10 nanometers;

(c) moulding the nanostructural mixture to form a moulded body; and (d) heating the moulded body to a temperature sufficient to cause (i) a solid state reaction between the metal and carbon in the moulded body, (ii) release of the hydrogen as a gas, and (iii) sintering of the moulded body, thereby producing a body of the metal carbide.

7. A method as defined in claim 6, in which the metal is iron.

8. A method as defined in claim 6, in which the surfactant is dihexadecyl dimethyl ammonium acetate.

9. A method of producing a composite consisting of a body of a first metal with a dispersed particulate phase therein, said dispersed phase comprising a carbide of a second metal, said method comprising the steps of:

(a) forming a carbide body of said second metal by the method of claim 1 or claim 6;

(b) converting the carbide body into a powder;

(c) mixing the powder obtained from the carbide body with a powder of said first metal, in the proportions required for said composite;

(d) moulding said powdered mixture produced by step (c) to form a moulded body; then (e) heating the moulded body to a temperature sufficient to cause sintering of the moulded body, thereby producing said composite.

10. A method as defined in claim 9, in which said first metal and said second metal are the same metal.

11. A method as defined in claim 2, including the step of adding a surfactant to the powder mixture in the ball mill the like to facilitate the production of the nanostructural mixture.

12. A method as defined in claim 11, in which the surfactant is a cationic surfactant.

13. A method as defined in claim 11, in which the surfactant is dihexadecyl dimethyl ammonium acetate.

14. A method as defined in claim 7, in which the surfactant is dihexadecyl dimethyl ammonium acetate.

* * * * *

UNITED STATES PATENT AND TRADEMARK OFFICE
CERTIFICATE OF CORRECTION

PATENT NO. : 5,368,812
DATED : November 29, 1994
INVENTOR(S) : Andrzej Calka and Barry W. Ninham It is certified that error appears in the above-indentified patent and that said Letters Patent is hereby corrected as shown below:

Col. 3, line 68, delete "P1" before --(c)--.
Col. 5, line 47, insert "in" before --fact,--.

Signed and Sealed this

Twenty-eight Day of March, 1995

Attest:

BRUCE LEHMAN

*Attesting Officer*     *Commissioner of Patents and Trademarks*